United States Patent [19]
Waterman et al.

[11] 3,734,350
[45] May 22, 1973

[54] COLLAPSIBLE TUBE METERING CLOSURE

[75] Inventors: Neil S. Waterman, Stamford, Conn.; Stanley F. Lachowicz, New Britain, both of Conn.

[73] Assignee: Atlantic Design & Development Corporation, Stamford, Conn.

[22] Filed: Aug. 16, 1971

[21] Appl. No.: 171,813

[52] U.S. Cl. ................................. 222/92, 222/494
[51] Int. Cl. ............................................. B65d 35/40
[58] Field of Search ........................ 222/92, 94, 106, 222/207, 212, 213, 335, 491–495, 522, 526, 528, 531, 537, 559, 564, 451, 501

[56] References Cited
UNITED STATES PATENTS

| | | | |
|---|---|---|---|
| 2,556,571 | 6/1951 | Bobbs et al. | 222/92 |
| 2,128,035 | 8/1938 | Boetel | 222/92 |
| 2,477,200 | 7/1949 | Penney | 222/92 |
| 2,694,507 | 11/1954 | Ellioti | 222/92 |

*Primary Examiner*—Robert B. Reeves
*Assistant Examiner*—Larry Martin
*Attorney*—Buckles & Bramblett

[57] ABSTRACT

A movable plastic insert installed within the neck of a collapsible metal tube is engaged by an inwardly extending protrusion on the underside of a screw cap and is downwardly displaced within the top of the tube when the cap is screwed onto the tube end. Upon removal of the screw cap subsequent manual pressure applied to the collapsible tube body forces a limited amount of the contents, between the movable insert and the top of the tube out through the tube opening while the movable member moves upwardly to close the opening and prevent excess material from being extruded.

8 Claims, 12 Drawing Figures

Patented May 22, 1973
3,734,350
2 Sheets-Sheet 1
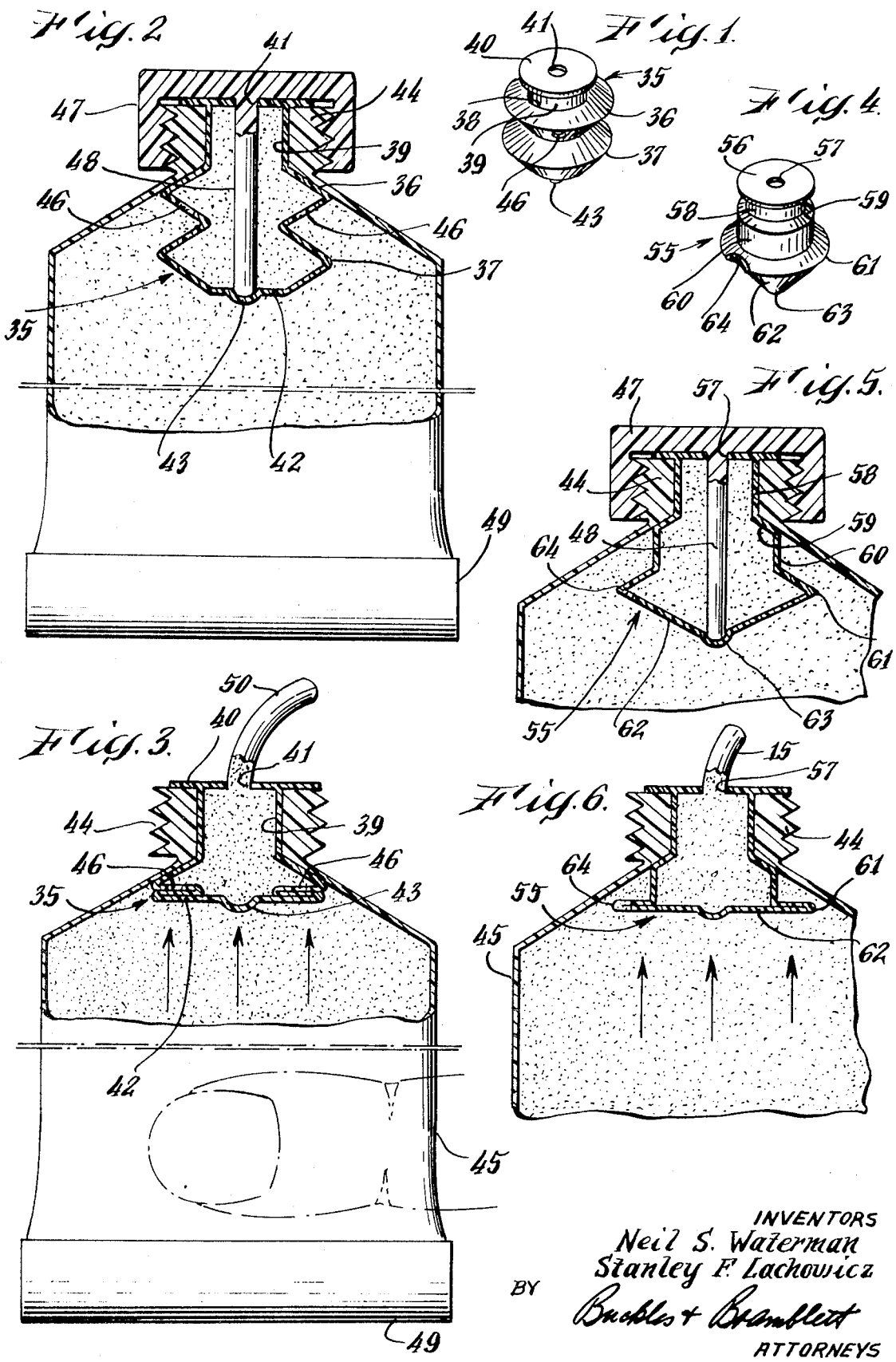
INVENTORS
Neil S. Waterman
Stanley F. Lachowicz
BY
Buckles + Bramblett
ATTORNEYS Patented May 22, 1973
3,734,350
2 Sheets-Sheet 2
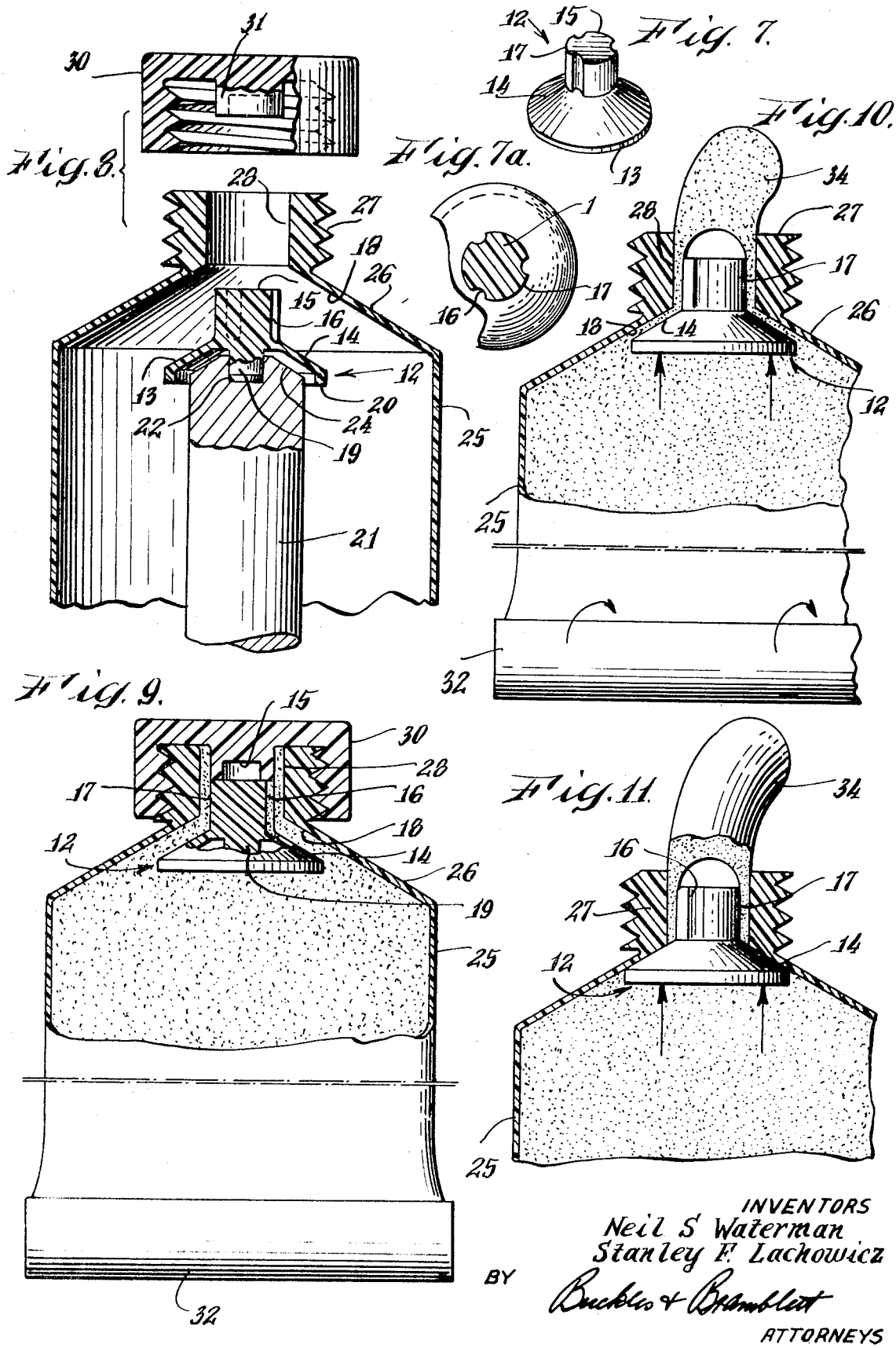
INVENTORS
Neil S. Waterman
Stanley F. Lachowicz
BY
Buckles & Bramblett
ATTORNEYS

COLLAPSIBLE TUBE METERING CLOSURE

BACKGROUND OF THE INVENTION AND PRIOR ART

The invention relates to the old problem of limiting the amount of paste material that may be squeezed out of a collapsible metal tube at any one time. Parents with small children have long been plagued by infant fascination with squeezing snake-like extrusions of toothpaste, shaving cream and other mushy materials from such tubes as may be found in every household. More importantly, the invention relates to means not only for limiting excessive paste extrusion but also for actually metering exact amounts of such materials which may be extruded on each occasion for dispensing, and for assuring accurate repeatability of such measured dispensed quantities of material with each successive use of the collapsible container. The invention is thus useful in controlled dispensing of precisely limited quantities of medicated ointments and the like, which may be quite concentrated, even caustic, and possibly dangerous or injurious if applied in excess. The accurate repeatability of measured quantities of material dispensed by the closure of the invention also enables the invention to be used in the mixing or blending or paint pigments where, for example, a precisely measured small quantity of concentrated pigment may be added to a larger quantity of neutral color base paint and the two are then mixed to produce a prescribed color tint.

Prior art efforts at solving these problems have included spring loaded valve inserts, ball-check-valves, graduated screw caps to serve as measuring cups, and other complicated combinations of such structures — all of which have proven either too costly, cumbersome or otherwise unattractive and unsuccessful in the market place.

SUMMARY OF THE INVENTION

The present invention solves these vexing problems by a simple, inexpensive, molded plastic insert which is installed within the neck of a collapsible metal tube at the time of fabricating the tube and before the tube is filled with its intended contents. In the normal course of manufacture the exterior of the tube may also be imprinted with identifying indicia at this stage if desired. In one embodiment of the invention the insert may be a substantially solid, generally conically shaped piece, having an upper conical surface substantially conforming to the inner conical taper of the collapsible tube top, and a cylindrical upper portion loosely fitting within the inner cylindrical neck of the tube top. In another embodiment of the invention the insert may be a collapsible molded plastic bellows, of one or more convolutions, having one or more restricted apertures in a foldable convolution, and an upper tubular portion fixedly secured in the tube neck. In both of these embodiments a depending central portion of a screw cap adapted to fit onto the open end of the collapsible tube extends downwardly within the tube neck a sufficient distance to nudge the plastic insert downwardly when the cap is screwed in place to close the tube. Alternatively, the central cylindrical portion of the substantially solid metering element of said first mentioned one embodiment may be formed somewhat longer than the neck of a collapsible tube into which it is inserted and the entire element may thereby be depressed downwardly by engagement with a flat inner cap closed surface. Similarly in the alternative bellows embodiment a centrally disposed rigid pin member may be formed within the bellows fixed to the bottom thereof with its upper end engageable by a substantially flat inner cap closure surface.

OBJECTS OF THE INVENTION

Accordingly it is an object of the invention to provide an improved metering closure for controlled dispensing of measured quantities of paste-like materials from collapsible tube containers.

Another object of the invention is to provide such a dispensing closure in which the metering function is automatic, the quantity to be dispensed being determined at the time of manufacture and assembly of the closure.

A further object of the invention is to provide a metered dispensing closure capable of accurately measuring and dispensing different materials having widely varying viscosities.

Another object of the invention is to provide such a dispensing closure in which the metered quantities of material dispensed is accurately repeatable on each successive use regardless of changes in viscosity which may occur due to aging or evaporation of the tube contents.

An overall object of the invention is to provide a metered dispensing closure having all of the above attributes and which is also simple and economical to manufacture and assemble.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing, in which:

FIG. 1 is a perspective view of a multiconvoluted flexible plastic bellows insert which forms the metering element in one embodiment of the invention;

FIG. 2 is a front view, partially in cross-section, of a collapsible tube with an insert as illustrated in FIG. 1 mounted therein and with a screw cap closure in place;

FIG. 3 is a front view, partially in section, similar to FIG. 2 but with the cap removed, illustrating how the bellows insert collapses under manually applied squeezing pressure on the tube to extrude a limited quantity of paste;

FIG. 4 is a perspective view of an alternative single convolution flexible plastic bellows insert as may be employed for metering dispensation of smaller quantities of paste;

FIG. 5 is a front cross-sectional view of the top portion of a collapsible tube showing the bellows of FIG. 4 inserted therein; and showing how the bellows is distended downwardly by a central portion of the screw cap mounted in its tube closing condition;

FIG. 6 is a cross-sectional view similar to FIG. 5 but with the screw cap removed and showing how the bellows insert of FIG. 4 collapses under pressure applied to the tube to extrude a small quantity of the paste contents;

FIG. 7 is a perspective view of an alternative form of solid plastic insert;

FIG. 7a is a top cross-sectional view of the upper cylindrical portion of the insert of FIG. 7 showing the location of parallel grooves spaced about the periphery thereof;

FIG. 8 is an exploded cross-sectional view showing the upper portion of a collapsible tube and screw cap, with the insert of FIG. 7 supported on a mandrel as may be employed during assembly;

FIG. 9 is a front view of a filled collapsible tube, partially in cross-section, showing the structure of FIG. 8 as completely assembled with the screw cap closure in place;

FIG. 10 is a front cross-sectional view similar to FIG. 9 but with the screw cap removed and showing the manner in which the plastic insert metering element of FIG. 7 is moved upwardly in response to internal pressure within the squeezed tube to extrude a measured quantity of contents; and FIG. 11 is a cross-sectional view similar to FIG. 10 showing the insert element of FIG. 7 fully seated in its uppermost position to stop the extrusion of additional material.

DETAILED DESCRIPTION OF THE DRAWINGS

Referring first to FIGS. 7 through 11 a preferred simple embodiment of the invention will be described. As illustrated in FIG. 7 of the drawings a substantially rigid member indicated generally at 12 is formed as a conical flange 13 with conically tapered upper surface 14 supporting a concentrical cylindrical top portion 15 having a plurality of parallel vertical grooves 16—16—16 uniformly spaced around the outer cylindrical surface 17. The element 12 is preferably made of molded plastic material such as polypropelene, or polyvinyl chloride, or it may be formed of die-cast soft metal, or other suitable material such as rubber, for example. The taper of the conical surface 14 is at the same angle as that of the inner conical surface 18 (FIG. 8) of the collapsible tube in which it is to be installed.

Referring now to FIG. 8 of the drawings, the manner of assembly will be described. The element 12, as shown in cross-section in FIG. 8, is formed with a depending central pin portion 19 which extends downwardly from the center of conical flange 13. The bottom rim of flange 13 preferably terminates in a short cylindrical wall portion 20 as shown in FIG. 8, and the pin 19 and wall 20 cooperate to support the element 12 on the top of a mandrel 21 during assembly of the closure device into an unfilled collapsible tube. A recess 22 in the top of mandrel 21 receives pin 19 of element 12, the upper surface of mandrel 21 is tapered to conform to the inner surface of conical flange 13, while the inner surface of cylindrical wall 20 conforms to the outer diameter of mandrel 21, whereby element 12 is securely supported by mandrel 21 during the assembly operation. In normal tube filling operations a collapsible tube having a thin cylindrical wall 25, surmounted by a slightly heavier conical top portion 26 and a threaded cylindrical neck portion 27 is moved by conveyor means (not shown) to a station where mandrel 21 with insert element 12 mounted thereon moves upwardly through the open bottom of tube cylinder 25 to implace the insert element 12 within the top portion 26 and neck portion 27. The outer diameter of cylindrical surface 17 on element 12 is substantially smaller than the inner diameter of cylindrical surface 28 of neck portion 27 so that the cylindrical portion 15 of element 12 fits easily and loosely within neck 27. The height of cylindrical portion 15 is preferably less than the height of cylinder wall 28 so that even when fully seated the top of cylinder 15 does not come level with the top of tube neck 27. Simultaneously with the insertion of element 12 into the tube 25 other machine means (not shown) descend to apply a molded plastic screw cap 30 to the threaded neck 27 of the tube 25. As shown in FIG. 8 cap 30 is formed with a downwardly depending central hub portion 31, which is preferably the same diameter as cylindrical portion 15 of element 12.

Referring now to FIG. 9 of the drawings, when the cap 30 has been completely screwed onto the neck 27 the hub 31 engages the upper surface 15 of insert element 12, thereby holding conical surface 14 of insert element 12 spaced from the inner conical surface 18 of tube top 26. At this stage of operations the tube 25 is filled through its open bottom and the mandrel 21 is simultaneously withdrawn, leaving the element 12 supported entirely by the contents within the tube 25. The bottom of the tube 25 is then squeezed flat, folded over on itself and sealed at 32 in a manner well established in this art. As shown in FIG. 9, when the tube is filled and closed a portion of the fluid contents completely surrounds element 12, filling not only the space between conical surfaces 14 and 18 but also surrounding the cylindrical portion 15 and cap hub 31 to fill the space between concentric cylindrical surfaces 17 and 28.

Reference is now made to FIG. 10 of the drawings which illustrates the action when the tube cap 30 (FIGS. 8 and 9) is removed and pressure is applied to the collapsible tube contents by rolling up the bottom seal 32 onto the tube body 25. The internal fluid pressure within tube 25 forces the rigid insert element 12 upwardly as indicated by the vertical arrows in FIG. 10, thereby forcing the material lying between surfaces 14-18 and 17-28 upwardly and out of the open neck 27 in the form of an external, generally cylindrical, paste extrusion 34. As the application of internal pressure within tube 25 continues the inserted element 12 reaches its uppermost position as shown in FIG. 11 where the matching conical surfaces 14 and 18 meet each other to effectively close and seal the bottom opening of tube neck 27 thereby stopping any further extrusion of paste from the tube 25, whereby the amount of extrusion 34 is thus limited. When the extruded material 34 has been removed from the open end of tube neck 27 and the closure cap 30 is again screwed in place as shown in FIG. 9, the depending internal cap hub 31 again pushes the movable insert plug 12 downwardly within the top portion 26 of tube 25 thereby allowing an additional quantity of the fluid contents, under the influence of internal pressure within collapsible tube 25, to flow into the space between surfaces 14-18 and 17-28 and the device is conditioned for a repeat of the metered dispensing operation as described above with reference to FIGS. 10 and 11.

The depth and number of parallel grooves 16—16—16 as shown in FIGS. 7 and 7a, and the diameter of cylindrical plug portion 15 with respect to the inside diameter of cylindrical neck opening 28, may be chosen in the manufacture of these parts to provide either a greater or lesser accumulation of fluid paste between the cylindrical portion 15 of movable plug element 12 and the inner surface 28 of neck 27, as may be desired for the particular application of the contents. Similarly, the length of the internal cap hub 31, and the height of cylindrical portion 15 of plug 12, may be chosen at the time of manufacture of these parts to produce any desired spacing between conical surfaces 14 and 18, whereby the amount of accumulation of paste material therebetween may be selected to produce the optimum amount of paste extrusion during each operation of the dispenser, depending upon the consistency and intended end use of the contents to be dispensed.

ALTERNATIVE EMBODIMENT

Reference is now made to FIGS. 1 through FIG. 6 of the drawings which disclose an alternative embodiment of the invention particularly adapted for even more precise metering and exact repeatability of measured quantities of material as dispensed from collapsible tubes according to the invention. In this embodiment a flexible, collapsible molded plastic bellows is inserted into the neck of a collapsible metal tube, in place of the substantially rigid solid plastic insert plug described hereinbefore with reference to FIGS. 7 through FIG. 11. As shown in perspective by FIG. 1 of the drawings a unitary molded plastic bellows member, indicated generally at 35, may be formed with a plurality of foldable convolutions 36 and 37, with the upper convolution 36 having its inner diameter 38 joined to an upper cylindrical portion 39 which is surmounted by a flat circular flange top 40 having a central opening 41 therethrough. The lower bellows convolution 37 is closed by an annular bottom portion 42 having a central dimple 43 formed therein, as more clearly seen in cross-section in FIG. 2. At least one aperture 46 is formed in one of the bellows convolutions as shown in FIG. 1.

Referring now more particularly to FIG. 2 of the drawings, the flexible plastic bellows member 35 is inserted into the neck 44 of a collapsible tube 45 and is held securely therein by engagement of the neck 44 between the overhanging annular flange of bellows top portion 40 and the upper conical surface of bellows convolution 36. A screw cap 47 is formed with a centrally disposed depending pin 48 which passes through the opening 41 in the top portion 40 of bellows insert 35 and engages the central dimple 43 in the bottom portion 42 to distend the bellows 35 within the top portion of tube 45 when the cap 47 is screwed into closed position, as shown in FIG. 2. When the tube 45 has been filled with flowable contents, and the tube bottom 49 has been sealed and folded, the internal fluid pressure within tube 45 forces some of the contents within the upper portion of tube 45 through the bellows openings 46—46 to fill the space within the extended bellows 35 and surrounding the central pin 48. The device is now conditioned to dispense a limited quantity of material contained within the bellows member 35.

Reference is now made to FIG. 3 of the drawings which illustrates the manner of dispensing this limited quantity of material when the cap 47 has been removed and manual pressure is applied to the body of collapsible tube 45. The increased internal pressure, indicated by vertical arrows in FIG. 3, forces the bottom portions 42–43 of bellows 35 upwardly, compressing the convolutions 36 and 37 thereof against each other and extruding a limited quantity of material 50 through the uncovered opening 41 in the top 40. The compression of bellows convolutions 36 and 37 into flat folded engagement as shown in FIG. 3 effectively closes and seals bellows openings 46—46, thereby preventing any more material within tube 45 from entering the bellows member 35. When the cap is again restored, as shown in FIG. 2 of the drawings, and the tube bottom 49 is rolled up, the extended bellows again fills with material through openings 46—46 and the device is ready to dispense another and equally measured quantity of material.

Reference is now had to FIG. 4 of the drawings which is a perspective view of a modified form of a collapsible molded plastic bellows insert similar to that of FIG. 1 but having only a single bellows convolution. A bellows element as depicted in FIG. 4 is especially suitable for metered dispensing tubes, according to the invention, from which it is desired to dispense only a very small quantity of paste or ointment on each application and where the small amount dispensed must be very accurately repeatable for each application. As shown in FIG. 4 the small bellows element indicated generally at 55 comprises a flat annular rimmed top portion 56, having a central opening 57, which surmounts a hollow cylindrical neck engaging portion 58 substantially the same as described hereinabove with reference to the corresponding portions of FIG. 1. Below the cylindrical portion 58 of the element 55 is a conically tapered shoulder portion 59 which engages the correspondingly tapered inner surface of the tube neck 44 (as shown in FIG. 5) to securely hold the entire element 55 within the neck of collapsible tube 45. Below the conical shoulder portion 59 of element 55 a larger diameter cylindrical section 60 extends to a single bellows convolution 61 which is closed by a conically tapered bottom potion 62 in the center of which is formed a dimpled recess 63. At least one small opening 64 is formed in the acute convoluted angular edge of bellows element 55, all as shown in both FIG. 4 and FIG. 5.

Referring now particularly to FIG. 5 of the drawings it will be seen that the screw cap 47 is provided with a centrally depending rigid pin 48 which functions in the same manner as the correspondingly numbered parts of FIG. 2, to engage the inner surface of the dimpled bottom 63 in FIG. 5 and thereby extends the foldable bellows insert element 55 downwardly into the upper portion of collapsible tube 45. The tube 45 is filled with flowable contents in the same manner as described hereinabove with reference to FIG. 2, and the internal space within bellows element 55 also fills with material which passes through opening 64 to surround pin 48. As shown in FIG. 5 the device of the invention is conditioned for dispensing a limited quantity of material when the cap 47 is removed.

Referring now to FIG. 6 of the drawings the dispensing action of this embodiment of the invention is illustrated. With the closure cap removed internal fluid pressure indicated by the vertical arrows, which results either from squeezing the collapsible tube 45 or from rolling up its bottom end (not shown in FIG. 6 but as shown in FIGS. 2 and FIG. 3), causes the bottom 62–63 of bellows element 55 to move upwardly, thereby extruding through the top opening 57 a limited but accurately metered small quantity of material contents 65. When the bellows element 55 is completely folded as shown in FIG. 6 the overlapping adjacent bellows surfaces of convolution 61 effectively close the edge opening 64 and thereby prevent any more material from the contents of tube 45 from entering the bellows 55 and thus terminate the extrusion 65 from opening 57. When the cap 47 is again replaced as shown in FIG. 5, the pin 48 again engages the bottom dimple 63 to extend the bellows 55 downwardly within tube 45, more material flows from within tube 45 through opening 64 into bellows 55, and the device is again conditioned for subsequent dispensing of an exactly equal amount of extruded material 65 upon the next occasion.

While the metered closure devices of the invention have been illustrated and described with reference to screw caps, it is to be understood that the invention is not limited to such structures but that other types of closures may be employed such as, for example, hinged caps, snap fasteners, sliding friction engagement, and the like.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, which as a matter of language, might be said to fall therebetween.

Having described our invention, what we claim as new and desire to secure by Letters Patent is:

1. In a metered dispensing closure for collapsible tube containers the combination comprising:
   A. a movable element inserted within the upper portion of a collapsible tube and extending at least partially into the neck opening thereof, and
   B. a removable closure cover fitable onto the neck of said collapsible tube and having a centrally disposed depending protrusion extending at least partially within the top portion of said neck opening and into engagement with a top portion of said movable element,
whereby said closure cover when fitted on said tube neck depresses said movable element within said tube to allow a limited portion of the tube contents to flow into space remaining between said movable element and the neck opening of said tube, and when said closure cover is removed pressure applied to said collapsible tube moves said movable element to extrude said limited portion of contents and to close the bottom of said neck opening thereby preventing the extrusion of additional contents.

2. The combination of claim 1 wherein said movable element is formed of substantially rigid molded plastic material and said element comprises:
   A. a substantially cylindrical solid top portion loosely fitable within the bottom opening of said tube neck, and
   B. a conically tapered flared flange portion of greater diameter than said cylindrical top portion,
      1. the taper of said flange portion substantially corresponding to a conically tapered inner surface within the top portion of said collapsible tube, whereby upon upward movement of said molded plastic element said tapered flange portion engages said tapered inner tube surface to close and seal the bottom of said neck opening.

3. The combination of claim 2 wherein the substantially cylindrical top portion of said movable element is ribbed with a plurality of substantially parallel grooves formed in the outer periphery thereof.

4. The combination of claim 1 including mandrel mounting means formed on the bottom of said movable element whereby said element may be supported on the end of a removable mandrel during the manufacturing steps of assembling said metered closure and filling said collapsible tube container.

5. The combination of claims 1 and 2 wherein said removable closure cover is a screw threaded cap and said depending protrusion is a coaxial cylinder of substantially the same diameter as the top portion of said movable element.

6. In a metered dispensing closure for collapsible tube containers the combination comprising:
   A. a movable valve element insertable within the upper portion of a collapsible tube and extendable at least partially into the neck opening thereof,
   B. a removable closure cover fitable onto the neck of a collapsible tube into which said movable element is insertable, and
   C. means intermediate said movable valve element and said closure cover and engageable with said cover in closed position to impart downward motion to said movable valve element within the upper portion of a collapsible tube into which said movable valve element is inserted.

7. The combination of claim 6 wherein said movable element is a collapsible bellows formed of flexible molded plastic material and said element comprises:
   A. a substantially cylindrical thin walled hollow upper portion snugly fitable within the neck opening of a collapsible tube container,
   B. a flat annular top portion joined to one end of said cylindrical wall portion and having,
      1. an annular flanged rim extending beyond the outer periphery of said cylindrical wall portion and overlying the annular neck top of a collapsible tube container with which said element is inserted,
      2. a central opening therethrough into said hollow cylindrical wall portion,
   C. at least one foldable bellows convolution joined to the opposite end of said cylindrical wall portion and extending downwardly into the body of a collapsible tube container in which said element is inserted, and
   D. at least one opening through a foldable portion of said bellows whereby fluid contents within said collapsible tube container may enter said bellows when said element is extended,
      1. said opening being closed when said bellows is collapsed into its folded condition.

8. A metered dispensing closure according to claim 11 wherein said movable valve element comprises a conically tapered rigid member insertable into a collapsible tube container prior to filling thereof with fluid material, the conical angle of said tapered member conforming to the internal conical angle at the neck base of a collapsible tube into which said member is inserted, a substantially cylindrical portion of a diameter less than the internal neck diameter of said tube formed atop the apex of said conical member and extending into the neck of said tube, and a removable mandrel insertable through the bottom of a collapsible tube as means for supporting said valve element within the neck of said tube during the filling thereof.

* * * * *